United States Patent Office 2,914,438
Patented Nov. 24, 1959

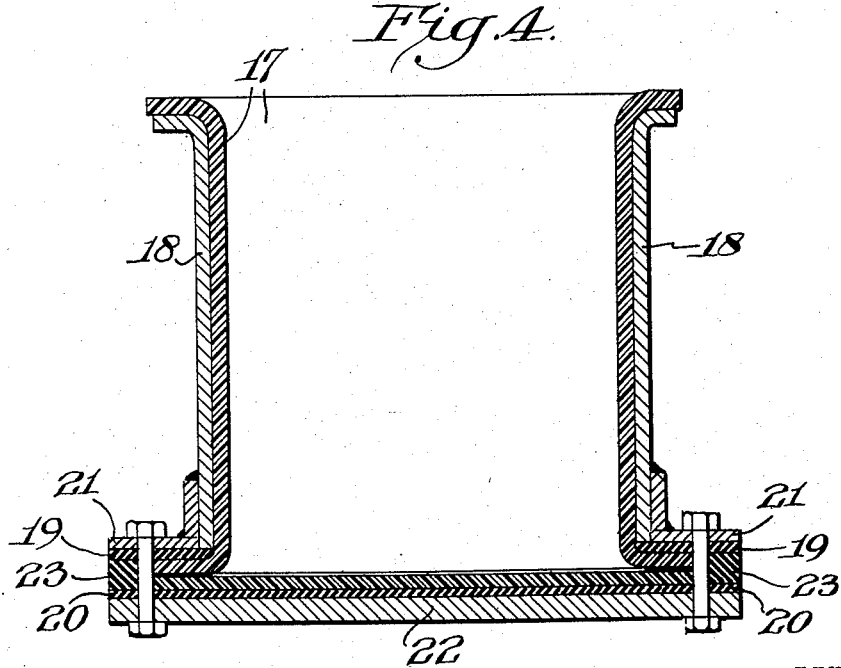

2,914,438

BONDING POLYTETRAFLUOROETHYLENE RESINS

Bernd Wilhelm Sandt and Peter John Wayne, Wilmington, Del., assignors to E. I. du Pont de Nemours and Company, Wilmington, Del., a corporation of Delaware Application March 26, 1956, Serial No. 573,963

1 Claim. (Cl. 154—139)

This invention relates to a bonding process, and more particularly to a process for bonding sintered shapes of polytetrafluoroethylene resin to one another to form strong unplasticized electrically integral composite articles. This case is a continuation-in-part of U.S. Serial No. 388,872, filed October 28, 1953, now abandoned.

In general, polytetrafluoroethylene resins are synthesized in the form of fine particles, and these may be fabricated into strong useful shapes by placing them into contiguous relationship and then fusing or "sintering" them into a solid mass at temperatures above 327° C., as, for example, by the process of Brubaker et al. U.S. Patent 2,400,099. Such forming and sintering techniques, however, are not well adapted to the fabrication of large or complex shapes having a relatively thin dimension, i.e., in the range of 20 to 250 mils, because flaws and weak spots tend to develop as the result of non-uniform preforming pressures. Ideally, therefore, large or complex thin shapes should be fabricated from a plurality of smaller, simpler soundly preformed shapes.

It is quite difficult, however, to weld one shaped unsintered preform of polytetrafluoroethylene to another so as to form a sound bond between them, since the preforms are relatively fragile, and flaws tend to develop at the point of juncture. Accordingly, it would be highly preferable to form large or complex thin shapes of polytetrafluoroethylene by bonding the much stronger sintered shapes of polytetrafluoroethylene together. Unfortunately, it is also very difficult to weld sintered shapes of polytetrafluoroethylene resin directly together, and only relatively weak porous bonds are obtained in many cases even after heating for several hours under pressure at temperatures up to 400° C.

It has previously been proposed to bond sintered shapes of polytetrafluoroethylene resin to one another by using a colloidal dispersion of unsintered polytetrafluoroethylene resin as a bonding agent; see Berry U.S. Patent 2,484,484. This procedure has been found to yield strong bonds between the fused surfaces; however, the bonds obtained are not electrically integral, and, therefore, the resulting products are not well adapted for use in applications such as electrical insulation or linings for tubes, tanks, troughs, etc. for the handling of corrosive fluids, or other applications requiring impermeability.

It has also been proposed to bond sintered shapes of polytetrafluoroethylene resin to one another by using a blend of fluorocarbon or chlorofluorocarbon oil with finely divided polytetrafluoroethylene as an adhesive; see Compton et al. U.S. Patent 2,510,078 and Benning et al. U.S. Patent 2,720,498. These procedures make it possible to obtain strongly bonded plasticized products in a relatively short time. However, in comparison to integral polytetrafluoroethylene resin, these plasticized products are quite permeable. Moreover, they are softer and weaker than unplasticized polytetrafluoroethylene resin, and, accordingly, tend to deform or break or develop flaws under normal service conditions, which may involve continuous exposure at temperatures of up to 260° C. Hence these products are also unsuitable for many applications requiring high strength and impermeability.

It is an object of the present invention to provide a process for bonding sintered shapes of polytetrafluoroethylene resin to one another to form strong, unplasticized, electrically integral composite articles. A further object is to provide a process for bonding sintered shapes of polytetrafluoroethylene to one another to form strong, unplasticized, electrically integral composite articles having the impermeability of integral polytetrafluoroethylene. Other objects will appear hereinafter.

According to the present invention, it has been found that the aforesaid objects may be achieved by a process which comprises interposing between mating surfaces of sintered shapes of polytetrafluoroethylene resin a thin layer of finely divided unsintered polytetrafluoroethylene resin blended in weight ratio of from 1 to 1 to 1 to 5 with a heat fugitive halocarbon plasticizer which is liquid at 100° C. and has an initial boiling point in the range of 340 to 390° C., and subjecting the resulting assembly to uniform heat and pressure at a temperature of 340 to 390° C. for from 5 to 45 minutes until the heat fugitive plasticizer is eliminated and an unplasticized composite article is obtained. In an especially preferred process, the finely divided unsintered polytetrafluoroethylene resin employed is in the form of discrete particles having an average dimension of less than 50 microns, the discrete particles themselves being aggregates of particles of colloidal size, blended with a telomer of chlorotrifluoroethylene.

Reference is made hereinafter to the several figures of the drawing, which are briefly described as follows:

Figure 1 shows a corrugated scarf joint construction useful in joining polytetrafluoroethylene sheets.

Figure 2 shows apparatus adapted for heating and pressing straight seal assemblies.

Figure 3 shows a heating and pressing apparatus adapted to the making of circular seals.

Figure 4 shows the details of a drum lined with polytetrafluoroethylene by the process of the invention.

It is essential that the heat fugitive halocarbon plasticizer employed have a pronounced plasticizing action on polytetrafluoroethylene resin, and a combination of volatility, oxidative stability, and thermal stability properties such that the time required to eliminate it from the assembly being bonded is not less than 5 minutes nor more than about 60 minutes, at temperatures of 340 to 390° C. Halocarbons meeting these requirements comprise the substantially completely halogenated fluoro- and chlorofluorocarbons containing not more than about 41 percent chlorine by weight which are liquids at 100° C. and have an initial boiling point in the range of 340 to 390° C. In general, such materials average about 18 to 35 carbon atoms per molecule and have an average molecular weight of 1000 to 2000. They may be prepared in a variety of ways known to the art, as for example, by fluorination of hydrocarbons, or by the telomerization of tetrafluoroethylene or chlorotrifluoroethylene. Representative methods are described in "Industrial and Engineering Chemistry," vol. 39, No. 3.

At the elevated temperatures of 340 to 390° C. required in the practice of the present invention, the heat fugitive halocarbon plasticizers are eliminated from the assembly partly by vaporization, partly by oxidative degradation, and partly by thermal decomposition into volatiles and carbonized residues which manifest no plasticizing action. The chlorotrifluoroethylene telomers are preferred to the more completely fluorinated plasticizers, inasmuch as the former are more readily decomposed by heat, and hence more readily eliminated than the latter. An especially preferred chlorotrifluoroethylene telomer having an initial boiling point of about 360° C. is commercially available under the name "Hooker Oil Fluorolube LG," a product of the Hooker Electrochemical Company of Tacoma, Washington.

In obtaining unplasticized electrically integral composite articles, the unsintered polytetrafluoroethylene resin employed as a component of the bonding aid may, in general, be any finely divided high molecular weight homopolymer of tetrafluoroethylene softening above 327° C. However, in order to obtain bonded articles having a permeability of the same order of magnitude as integral polytetrafluoroethylene resin, it is essential that the finely divided unsintered polytetrafluoroethylene be in the form of discrete particles having an average size of less than 50 microns, the discrete particles being aggregates of particles of colloidal size, and resin in such form is generally preferred. The preferred resin component of the bonding aid may be obtained in various ways, conveniently from unsintered dispersion polymer of the kind produced by the process of Berry U.S. Patent 2,559,752 and coagulated by the process of Lontz U.S. Patent 2,593,583. The coagulated powder thus obtained is in the form of discrete particles having average size of 500 to 1000 microns, and may be subdivided to an average discrete particle size of less than 50 microns by air attrition, e.g., by subjecting it to the shearing action of a high velocity jet of fluid in a confined space. An effective means of comminution by this method is described in Andrews U.S. Patent 2,032,827.

The blending of halocarbon plasticizer and resin to form the bonding aid may be conveniently done in various ways, as, for example, by stirring the two ingredients together until a smooth paste results. Where the particle size of the resin component is not critical, blending may be effected by adding the halocarbon to an aqueous dispersion of polymer and removing water, as described in Holbrook U.S. Patent 2,510,117. It is important that the proportions by weight of plasticizer component to resin component in the bonding aid be in the range of from 1 to 1 to 5 to 1, respectively, and preferably about 3 to 1. Proportions somewhat outside these ranges can be used, although there is no particular advantage in so doing. However, if the proportions are too greatly varied, the beneficial results of the process of the present invention are not achieved.

Preferably, the articles to be joined will be at least 20 mils in thickness. Stocks thicker than 20 mils are sufficiently impermeable of themselves to prevent corrosive solutions from attacking underlying metal strata when used as linings. Stocks having a thickness of about 1/16 to 1/8 inch are quite suitable for corrosion resistant linings and also have the rigidity desirable for ready fabrication and use. Thicker stocks can also be welded but are somewhat more awkward to handle. Similarly, stocks thinner than 20 mils can be joined easily, but are more apt to develop flaws through deformation during the bonding operation. For best results, stocks used in fabricating linings should be fully sintered and stress relieved at a temperature of about 50° C. above the anticipated service temperature before being bonded. Such stocks should also be tested to insure the absence of pinholes in order to avoid penetration by liquids. Articles to be bonded should be carefully finished to insure good mating contact between surfaces at the area of the joint. This may be conveniently accomplished by sanding or milling the surfaces.

The optimum type of joint will depend to some extent on the circumstances of the particular case. Scarf joints are particularly well suited for joining sheet stocks at the edges, inasmuch as these avoid the bulky double thickness of lap joints. The chamfered edges of the sheet can be conveniently obtained with a rotary cutter or a milling machine. Advantageously, to increase the contact area and to assist in alignment of the joint, the surfaces may be tapered or grooved to form mating corrugations.

A preferred type of straight corrugated scarf joint is illustrated in exploded form in Fig. 1.

Circular bonds, such as required to join flared ends of polytetrafluoroethylene tubing, or to connect cylindrical inlets and drains to the main body of other liners, or to seal off the ends of cylinders may also conveniently be made by the process of the present invention. Generally, the surfaces of such bonds will be smooth, but they also may be grooved if desired in order to increase the contact area. Laminated structures may also be prepared, as for example, to reinforce a lining at a point of particular stress, and fine strands of metal or glass or other reinforcing material may be included within the sandwich to secure additional strength if desired. Strip stock may also be sealed around a core to form a thickly insulated wire by the process of the present invention. Numerous other types of joints will be obvious to those skilled in the art.

In the practice of the present invention the bonding aid is spread evenly by any suitable means, as by brushing, over the prepared bonding surface of at least one of the shaped articles to be joined, and the shaped articles are pressed together so that a thin layer of the bonding aid is interposed between and in intimate contact with both of said surfaces to form an assembly. Any excess bonding aid squeezed out is wiped off.

The unbonded assembly is then clamped or otherwise restrained to maintain contact during the heating operation. Preferably, the restraining pressure will be about 20-35 lbs./sq. in. For best results, it is essential that the pressure be evenly applied over the surfaces being joined.

A preferred apparatus for applying pressure on a straight corrugated scarf joint is illustrated in Fig. 2, which depicts an end view of polytetrafluoroethylene resin stock, 1 and 2, pressed between flat aluminum or copper strips 3 and 4, which are in intimate thermal contact with electrical strip heaters, 5 and 6, the outer surfaces of which are clamped or otherwise held so as to apply a uniform pressure on the weld area.

A similar device for welding a flanged tube to sheet stock is illustrated in Fig. 3. The flange 7, 8 of the tube 9 is butted against the area surrounding the perforation in the sheet 10, 11, and the exposed flat surfaces pressed between flat aluminum or copper rings 12, 13 which are in intimate thermal contact with electrical ring heaters 14 and 15. Again the outer surfaces of the rings are clamped or otherwise held so as to apply the desired uniform pressure on the weld area. A metal mandrel 16 closely fitting the interior of the tube is inserted therein to prevent buckling or warping during subsequent heating. Another method of applying pressure suitable for use, for example, in covering wire or other material with strip stock, consists in wrapping the positioned strip tightly with porous glass cloth or metal screening. Various other suitable alternatives and methods of applying even pressure will be obvious to those skilled in the art.

In fusing the assembled and pressurized sandwich, it is also important to insure an even distribution of heat over the entire weld area in order to avoid unequal thermal expansion or hot spots which tend to cause flaws in the weld. This is conveniently done in the apparatus in Figs. 2 and 3 through the use of aluminum or copper plates between the heaters and the resin, such plates serving the dual function of heat and pressure distribution. Other highly conductive metals, such as silver, may also be used. The heating may be carried out in various other ways, as for example, by means of circulating air ovens, or infrared exposure to obtain even distribution of heat.

The heating at temperatures in the range of 340 to 390° C. until the plasticizer is eliminated, leaving an unplasticized final composite article, is an essential step in the process of the present invention. At these temperatures, the time required to eliminate plasticizer and obtain an unplasticized composite article will be governed to some extent by the characteristics of the particular plasticizer employed, but must not be less than 5 minutes, and preferably not more than 60 minutes. Ordinarily a time of 10 to 45 minutes at temperatures in the range of 340 to 390° C. is effective with the preferred chlorotrifluoroethylene telomer type of plasticizer. Unplasticized products obtained by the process of the present invention have the strength and hardness of sintered integral polymer which has not been exposed to plasticizer. They contain less than two weight percent plasticizer, and ordinarily only trace amounts. Plasticized products, on the other hand, are weaker and softer and contain at least two weight percent plasticizer.

The unplasticized products obtained by the preferred process of the present invention are initially blackened as the result of thermal decomposition of the chlorotrifluoroethylene telomer. The discoloration can be removed by further heating in the presence of air at temperatures of 340 to 390° C. Such procedure serves as a further guarantee of adequate removal of plasticizer, since the undiscolored products obtained contain no detectable amounts of plasticizer at all.

Use of temperatures outside the prescribed range or failure to continue heating long enough to eliminate plasticizer so as to leave an unplasticized composite article results in weak permeable composite articles of limited utility, as previously indicated. The required time of heating at the required temperatures is governed to some extent by the characteristics of the particular plasticizer employed, but must not be less than 5 minutes, and preferably not more than 60 minutes. Ordinarily a time of 10 to 45 minutes at temperatures in the range of 340 to 390° C. is effective with the preferred chlorotrifluoroethylene telomer plasticizers. In general, products uniformly containing less than 2 percent plasticizer by weight are considered unplasticized; that is, their strength, flexibility, softness and other physical properties are indistinguishable from those of products not treated with plasticizer.

The invention is more particularly described and explained by means of the following examples which, however, are not intended to limit its scope. All parts are by weight unless otherwise specified.

*Example I.*—Thirty-five parts of polytetrafluoroethylene powder prepared by the process of Berry U.S. Patent 2,532,691, coagulated by the process of Lontz U.S. Patent 2,593,583, and dried at 100° C. under vacuum, and micronized by the process of Andrews U.S. Patent 2,032,827, was stirred into 65 parts of plasticizer consisting of "Hooker Oil Fluorolube LG," a product of the Hooker Electrochemical Company of Tacoma, Washington, to form a smooth paste.

The paste was spread evenly on a sanded smooth surface of each of two 2 x 1 x ⅛" strips of sintered polytetrafluoroethylene molded from granular powder by the process of Brubaker U.S. Patent 2,400,099 so as to prepare a ½ inch long coated surface on each strip. The coated surfaces were clamped together between flat steel plates at an even pressure of about 50 pounds per square inch, and the assembly was placed in a circulating air oven at 350° C. for 30 minutes, which treatment eliminated the plasticizer, leaving an unplasticized composite article. The shear strength of the bonded piece obtained as measured by pulling in the plane of the bond on an Instron machine at a draw rate of 20 inches per minute was 122 lbs. In comparison, the shear strength of an otherwise identical bond obtained by the process of the Benning et al. application, involving heating at 340° C. for 1 minute at 200 lbs./sq. in. pressure, and in which a substantial proportion of the plasticizer was not removed, was 60 pounds.

*Example II.*—Circular discs of polytetrafluoroethylene resin 3 inches in diameter and 20 mils thick and having a one-inch diameter hole in the center were bonded to two-inch diameter discs so as to prepare a circular seal covering the aforementioned hole and overlapping the hole ½ inch all around. The discs were cut from polytetrafluoroethylene shaved tape prepared by the process of U.S. Patents 2,406,127.

Bonding was accomplished by coating each of the surfaces to be joined with one of the bonding agents listed hereinafter, evenly pressing the coated surfaces together by means of spring-loaded steel plates at a pressure of 15–20 lbs./sq. in., and baking the sandwich so formed at a temperature of 340–370° C. for 10 to 20 minutes, by which treatment the plasticizer was eliminated and an unplasticized composite article was obtained. Bonding aids used were:

(A) Perfluorinated hydrocarbon having the approximate formula $C_{20}F_{42}$ and an initial boiling point at atmospheric pressure of about 360° C., obtained by the process described on pages 352–354 of Industrial Engineering Chemistry, vol. 39, No. 3, March 1947.

(B) Hooker "Fluorolube LG" having the empirical formula $(C_2F_3Cl)_x$, a white translucent suspension having an initial boiling point of about 360° C., obtained from the Hooker Electrochemical Company of Tacoma, Washington.

(C) Halocarbon 8–25HV, a clear oil having the empirical formula $(C_2F_3Cl)_x$ and an initial boiling point of about 380° C., obtained from the Halocarbon Products Company of North Bergen, N.J.

(D) Dry coagulated telomerized low molecular weight dispersion polymer produced by the process of batch D of Example 7 of U.S. Patent 2,559,752 except that 0.075 part of methanol was included in the polymerization recipe.

(E) Dry coagulated dispersion polymer produced by the process of U.S. Patent 2,532,691.

(F) Dry coagulated dispersion polymer as in (E) micronized by the procedure of U.S. Patent 2,032,827.

(G) Dry granular polymer produced by the process of Brubaker U.S. Patent 2,393,967.

(H) Dry granular polymer as in (G) micronized as in (F) and 65 parts of plasticizer as in (A).

The following mixtures were also used as bonding aids. In the mixtures the proportions of plasticizer to polymer were 65/35 and the two components were thoroughly blended to form a smooth paste.

(J) Plasticizer as in (A) and polymer as in (D).
(K) Plasticizer as in (A) and polymer as in (E).
(L) Plasticizer as in (A) and polymer as in (G).
(M) Plasticizer as in (B) and polymer as in (E).
(N) Plasticizer as in (B) and polymer as in (F).
(O) Plasticizer as in (B) and polymer as in (H).
(P) Plasticizer as in (C) and polymer as in (E).

Each of the seals so prepared was tested for permeability by means of a high voltage electric spark generator adjusted to produce a spark which would barely jump an air gap of about ⅝ inch to a conductor, and then passed over the area of the seal situated over a steel plate. Any imperfections in the seal were revealed clearly by the luminous path of the spark therethrough. By this test the seals prepared with materials (A) through (H) were found to be not electrically integral, while those of the blended materials (J) through (P) were electrically integral.

*Example III.*—Each of the discs described in Example II prepared using adhesive agents (K) through (P) was further tested for solvent permeability. For comparison, an integral disc cut from the 20 mil thick shaved tape of Example II was also tested. The test consisted in placing n-hexane in a metal cup, smearing the edges of the cup with a perfluorolube grease, covering the cup with the disc to be tested, clamping the disc securely in place, placing the assembly in a constant temperature (23.1° C.) room in inverted position, and measuring the weight loss periodically during a period of one month. Permeability values in each test were calculated from the slope of the curve obtained by plotting cumulative weight loss v. time. In each case the total area exposed was about 7.1 sq. inches. Hexane was selected as the solvent because it had been found in preliminary tests to give the highest permeability of several chemicals with straight unbonded films.

The results of the tests expressed in weight loss per day in grams were as follows:

| Joining agent: | Weight loss |
| --- | --- |
| (K) | 0.1 |
| (L) | 0.1 |
| (M) | 0.1 |
| (N) | 0.0065 |
| (O) | 0.075 |
| (P) | 0.1 |
| Control-integral film | 0.0018 |

*Example IV.*—A three-inch diameter disc having a one-inch diameter hole in its center as described in Example II was sanded to taper the material surrounding the hole from a feather edge at the hole periphery to full thickness at a distance of ½ inch from the said periphery. A two-inch diameter disc of the sort described in Example II was correspondingly tapered from its outside edge to mate with the three-inch disc just described, so that the two discs fitted together to form a composite of uniform thickness. The sanded surfaces were coated with the adhesive agent (N) of the Example II and bonded by heating between steel plates at 350–360° C. for 20 minutes under a uniform positive pressure of about 15–20 lbs./sq. in., by which treatment the plasticizer was eliminated, being an unplasticized composite article.

The seal so prepared was tested by the procedure of Example III and found to have a permeability of 0.0015 expressed in weight loss per day in grams.

*Example V.*—A lining for a 50-gallon steel vat was fabricated from ⅟₁₆ inch thick commercial polytetrafluoroethylene sheet stock as follows: The shorter edges of a 36 x 72 inch rectangular sheet were machined to provide mating parts of a scarf joint of the type illustrated in Fig. 1. These surfaces were coated with a paste (N) of Example III and bonded by heating under a pressure of about 35 lbs./sq. in. for about 30 minutes at a temperature of about 370° C. until the plasticizer was eliminated leaving an unplasticized composite article. The open-ended cylinder so formed was flared at one end to form a ¾ inch flange having about a ¼ inch radius. A circular sheet of stock was bonded to the flange by a procedure similar to that just described, except that equipment of the type described in Fig. 3 was used, and a wooden mandrel was inserted in the liner to prevent deformation in the vicinity of the weld area during bonding. Referring now to Fig. 4, the liner 17 was inserted into the closely fitting cylindrical metal shell 18, and bolted between rubbery gaskets 19 and 20 to a lip 21 of the metal cylinder and a metal bottom plate 22. A rubbery spacer 23 was provided external to the liner to distribute the bolting pressure evenly. The vat was used to advantage to contain corrosive liquids such as sulfuric, hydrochloric, and nitric acid for extended periods without any evidence of chemical attack on the metal retainer in the vicinity of the welded areas.

The method of the present invention may be used to advantage in the manufacture of a wide variety of articles in addition to the pipe joints, tank, tube and cylinder linings, and wire coverings previously mentioned, and is generally applicable wherever it is desired to effect a strong highly impermeable seal between polytetrafluoroethylene surfaces. The general method of the invention is also useful in forming joints between a polytetrafluoroethylene surface and another surface such as metal, glass, glass fabric, mica, asbestos, chinaware, plastics, natural and synthetic resins, wood and the like.

We claim:

The method of peripherally joining a plurality of strong thin heat-resistant substantially non-porous polytetrafluoroethylene articles to form an at least equally strong heat-resistant non-porous composite article which comprises preparing slightly roughened mating surfaces on the peripheries to be joined, interposing between and in intimate contact with said mating surfaces coagulated colloidal polytetrafluoroethylene subdivided by air attrition to a discrete particle size of less than 50 microns and blended with from 1 to 5 times its weight of chlorotrifluoroethylene telomer melting below 100° C. and having an initial boiling point in the range of 340 to 390° C., subjecting the resulting assembly to uniform heat and confining mechanical pressure at a temperature of 340 to 390° C. for from 10 to 45 minutes, and further heating the resulting composite article in air at a temperature of 340 to 390° C. until an undiscolored composite final article is obtained.

References Cited in the file of this patent

UNITED STATES PATENTS

| 2,510,078 | Compton et al. | June 6, 1950 |
| 2,510,112 | Holbrook | June 6, 1950 |
| 2,720,498 | Benning et al. | Oct. 11, 1955 |